June 10, 1952 H. A. W. KLINKHAMER 2,600,249
RECTIFYING INSTALLATION
Filed April 25, 1946 4 Sheets-Sheet 1

SERIES CONNECTED RECTIFIERS

PARALLEL CONNECTED RECTIFIERS

SERIES CONNECTED RECTIFIERS

PARALLEL CONNECTED RECTIFIERS

INVENTOR
HENDRIK ABRAHAM WIJNAND KLINKHAMER
BY
ATTORNEY

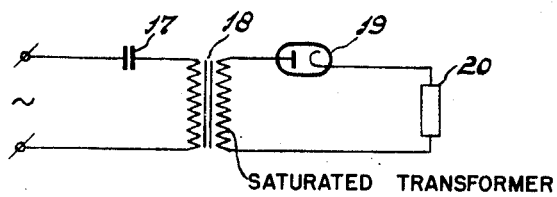
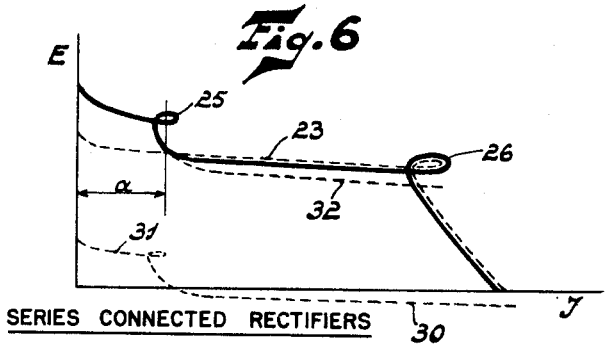
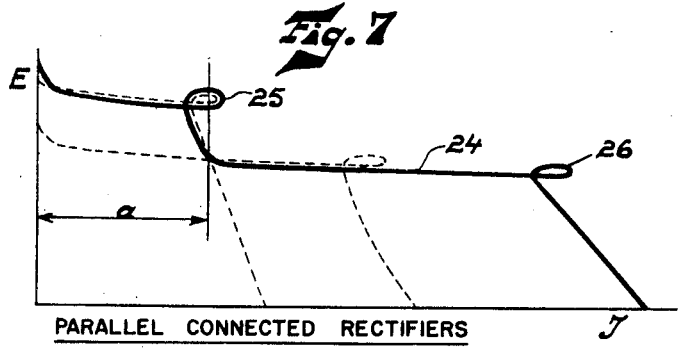
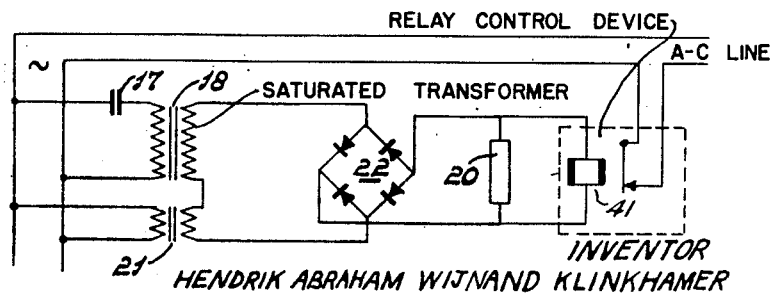

INVENTOR
HENDRIK ABRAHAM WIJNAND KLINKHAMER
ATTORNEY

Patented June 10, 1952

2,600,249

UNITED STATES PATENT OFFICE 2,600,249

RECTIFYING INSTALLATION

Hendrik Abraham Wijnand Klinkhamer, Eindhoven, Netherlands, assignor, by mesne assignments, to Hartford National Bank and Trust Company, Hartford, Conn., as trustee Application April 25, 1946, Serial No. 664,723
In the Netherlands March 9, 1942

Section 1, Public Law 690, August 8, 1946
Patent expires March 9, 1962

7 Claims. (Cl. 171—97)

This invention relates to a rectifying installation, which is more particularly suitable for charging batteries and comprises a rectifying circuit having a voltage-current characteristic curve which slightly varies with small loads and yields a current limitation in the case of higher loads.

According to the invention the output voltage of this rectifying circuit is connected either in series or in parallel with the output voltage of a second or auxiliary rectifying circuit having such a voltage-current curve that the resulting voltage-current curve also has a part whose voltage varies only slightly and, as the case may be, a current limiting part, but which first-mentioned part in the range of the low loads adjoins a part which exhibits a higher voltage than the corresponding part of the curve of the first-mentioned rectifying circuit individually.

This expedient yields a variation in shape of the voltage-current curve of the rectifying installation, which permits such a curve to be used in a broader field. The increased voltage in the part of the resulting characteristic curve in regard to the low load currents, whose increase may practically be chosen at will in accordance with the use intended, may, for instance, be used for switching on or off relays for charging batteries, buffer batteries or the like. This yields the special advantage that there are many possibilities of adaptation for various cases in accordance with the connection, i. e. in series or in parallel, and with the proportions of the transformers. In the present case a principal distinction should be made between the said series- and parallel-connection.

In the case of series-connection of the two transformer circuits the voltages are added, as a result of which the said voltage increase in the part of the resulting voltage-current curve in regard to low loads is, in principle, obtained with the smallest proportion of the auxiliary transformer circuit. However, by this series connection the range of substantially constant voltage in the resulting curve is reduced approximately to such a degree in comparison with the initial curve of the first rectifying circuit as corresponds to the value of the current range of the series-connected auxiliary rectifying circuit.

In the case of parallel-connection, however, the currents are added, due to which the output voltage of the parallel-connected auxiliary rectifier should be equal to the increased voltage of the resulting curve and consequently higher than the constant voltage of the first rectifying circuit. As a result thereof the proportions of the second transformer become, in principle, larger than in the first-mentioned case of the series-connection. On the other hand summation of the currents does not reduce the current range having a constant voltage in the resulting curve, but brings about a displacement thereof in the direction of the high load currents, which is very advantageous for certain uses. When adding the curves of the two rectifying circuits it may occur that the current limiting property of the curve of the first-mentioned rectifying circuit is eliminated, which is the case if the curve of the auxiliary rectifying circuit does not comprise a current-limiting portion.

The term "load" as used in this specification and claims refers to the total demand imposed on the rectifying installation. Thus where the installation supplies a charging current solely to a battery, the load is determined exclusively by the charging current flowing through the battery. This current, as is known, will vary depending on the extent of the charge attained by the battery. On the other hand, where the installation supplies a buffer battery, the load on the installation will depend on the overall demand constituted by the buffer battery and the load external thereto.

Another important advantage of the device according to the invention resides in that in accordance with the current range of the second rectifying circuit the current range of increased voltage of the resulting curve may be chosen higher or lower at will in accordance with the use and the loads. With loads comprising a buffer battery it may, for instance, occur that the battery must be charged to the maximum voltage with a comparatively high base load external to the battery, which is possible by a suitable choice of the said current range.

According to another feature of the invention the second rectifying circuit is caused to provide a dropping voltage-current characteristic whereby at least the transition between the part having a constant voltage to the part having an increased voltage of the resulting curve is steep.

This gives rise to a highly discontinuous transition between the two current ranges, as a result of which a sharper separation ensues between the two ranges. Moreover, the steep transition involves even with a slight current variation a comparatively large voltage variation, which may be advantageous for switching on or off gas- or vapour-filled discharge tubes, mechanical relays or the like. A third and at the same time very important advantage of such a transition is that in the case of network voltage variations the current range of this part of the characteristic varies to a smaller degree in accordance as to whether it is steeper, as a result of which the current range of the part having a constant voltage also remains as constant as possible with network voltage variations. This will be more fully explained in the description of the drawing. A total curve satisfying stringent conditions is obtained more particularly if the remaining part of the curve satisfies the requirement that in the case of network voltage variations only slight voltage variations of the curve should occur, which can be ensured by a suitable choice of the transformer circuit initially used.

As appears from what has been said above the second rectifying circuit may consist of a normal rectifying circuit, but also of a particular rectifying circuit and this in accordance with the conditions to be imposed upon the resulting curve.

The principle of the invention will be more fully explained by reference to the accompanying drawing wherein like elements are represented by like reference numerals.

Fig. 5 is a schematic circuit diagram of a rectifying circuit in accordance with the invention.

Fig. 6 is a curve illustrative of the invention when series connected rectifiers are employed.

Fig. 7 is a curve illustrative of the invention when parallel connected rectifiers are employed.

Figs. 8, 9, 10, 11, 12 and 13 are schematic circuit diagrams each representing a different preferred embodiment of the invention.

Figure 1:
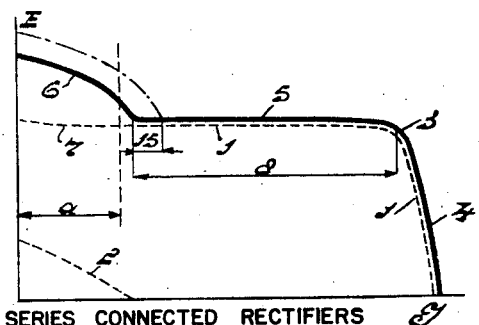
Fig. 1 is a curve illustrative of the invention when series connected rectifiers are employed.

In Figure 1 the reference number 1 designates a voltage current curve of a rectifying circuit which has already been proposed and comprises a part whose voltage slightly varies with small loads and a part yielding a current limitation in the case of high loads. The voltage and the current are represented by E and I. The reference number 2 designates the voltage current curve of a common rectifier.

By series-connection of the direct voltages of the two rectifiers according to the invention a resulting voltage current curve 3 is obtained, which also has a current limiting part 4 and a part 5 whose voltage varies only slightly. The last-mentioned part in the range of the small loads adjoins, however, a part 6 which exhibits a higher voltage than the corresponding part 7 of the curve 1 of the first-mentioned rectifying circuit individually.

As appears from the drawing the range of constant voltage of the curve 1 is reduced by the part 7 and consequently to a range 8 so that this circuit is limited to those cases where this is not objectionable. Moreover, the choice of the curve 1 and the maximum current strength to be delivered may be taken into account in designing the circuit. The voltage increase 6 over the current range $a$ may, as has already been stated in the preamble, be used for switching on or off discharge tubes, mechanical relays, safety or alarm devices and the like.

In charging buffer batteries where the current drawn from rectifier does not fall below that required by definite base load external to the battery, the voltage increase may be used for charging the battery thoroughly which may be gathered in the drawing from the voltage at the base load $a$.

By another choice of the curve 2 both the amount of the voltage increase and the current range thereof may be accommodated to the load conditions imposed on the installation. For example, the auxiliary rectifier circuit may be designed to furnish a voltage having an even steeper characteristic than that of curve 2 as shown.

Furthermore, it appears from the drawing that the rectifying circuit yielding the curve 2 has a comparatively much smaller size than that associated with the curve 1, which constitutes a particular advantage of the series-connection.

Figure 2:
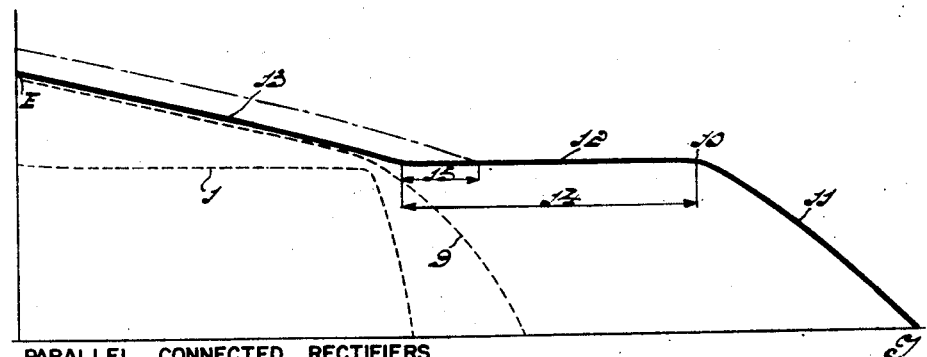
Fig. 2 is a curve illustrative of the invention when parallel connected rectifiers are employed.

Figure 2 deals with the case of parallel-connection. The curve of the formerly used transformer circuit bears again the reference number 1, the second rectifying circuit having a curve 9. The parallel connection yields a resulting curve 10 which also has a current limiting part 11 and a part 12 whose voltage varies only slightly, which part in the range of the small loads adjoins a part 13 having a higher voltage than that of the corresponding part 1 of the curve of the first-mentioned rectifying circuit individually.

From the drawing it appears that the part having a constant voltage has been shifted from the initial curve 1 to a higher current range 14. In this case also a resulting curve, which is as much as possible accommodated to requirements of the load, can be obtained by variation of the curves 1 and 9.

It will be appreciated that if one of the two rectifying circuits has a curve without a relatively sharp current limiting portion, the resulting curve will also have this property. This may be desirable under certain conditions.

The resulting curves 3 and 10 shown in Figures 1 and 2 are, in regard to their principal shape, eminently suitable for charging a buffer battery, for instance of automatic telephone exchange offices where it may occur that the battery must be charged to a suitable voltage with a certain minimum base load of general application external to the buffer battery. In that case the current with the minimum base load must be slightly smaller than the current at the transition between the part whose voltage varies slightly and the part where the voltage is increased.

As a rule the curve 10 shown in Figure 2 is particularly suitable in those cases where the load current has a constant and a variable portion, whereas the voltage must remain constant. In this case the constant part of the current is of the order of magnitude corresponding to the part 13, whereas the varying part extends to the curvature 10. The advantage of this circuit consists in that the installation consisting of two transformer circuits having curves 1 and 9 is cheaper than a single installation having a curve according to the principle of the curve 1, but having a current range equal to that of the curve 10.

In Figures 1 and 2 the portion of the resulting curve having an increased voltage exhibits only a small steepness. Consequently, with feed voltage variations of the network this portion originating from a common rectifier will also be liable to variations, which is indicated by a dash-and-dot line in the two figures. Both in Figure 1 and in Figure 2 the parts having a constant voltage will be reduced by a part 15 owing to the network voltage variations.

Figure 3:
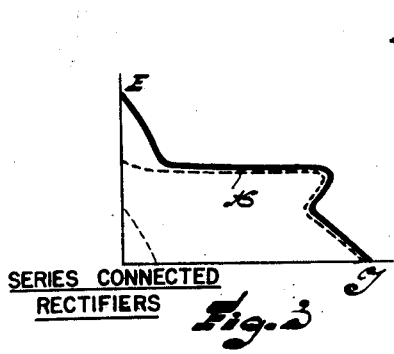
Fig. 3 is a curve illustrative of the invention when series connected rectifiers are employed.

In order to obviate this drawback a second rectifier is used, according to a further feature of the invention, to constitute a rectifier known per se having such a dropping voltage current curve that at least the transition between the part having a constant voltage and the part having an increased voltage is steep. This is illustrated in Figure 3 in regard to series-connection and in Figure 4 in regard to parallel-connection. In the case of network voltage variations the variations of the current range with a constant voltage are thus reduced to a minimum.

Figure 4:
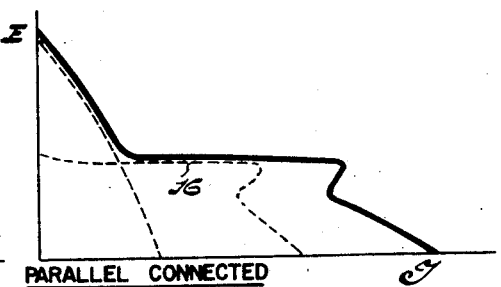
Fig. 4 is a curve illustrative of the invention when parallel connected rectifiers are employed.

The curves designated by 16 in Figures 3 and 4 can be obtained in a manner which has already been proposed by means of a rectifying circuit shown in Figure 5, by giving the condenser 17 and the saturated transformer 18 feeding the rectifier 19 and the load 20 suitable proportions.

In Figures 6 and 7 use is made of series- and parallel-connection respectively of rectifying circuits having curves originating from rectifying circuits as shown in Figure 8, which have already also been proposed per se.

In this figure corresponding parts bear the same reference numerals as in Fig. 5. However, the secondary of a small common transformer 21 is still interposed in series with the secondary of the transformer 18, both of them jointly feeding the Graetz circuit 22. Connected across the output of the installation is a relay 41 adapted to respond only to the voltage in the steep portion of the curve to control the line voltage. Since the relay is the mechanical equivalent to an electronic switch, the use of electron discharge tubes for the same purpose has not been illustrated.

From the curves shown in Figures 6 and 7 it appears that the resulting curves 23 and 24 have again a part with increased voltage, a part having a constant normal voltage and a current limiting part.

Moreover, the first-mentioned part also comprises a portion having a slightly varying voltage and a steep transition to the next part of the curve. Furthermore these curves in particular exhibit the loops 25 and 26 which are usually not closed actually; they form a voltage maximum and have proved to be advantageous more particularly in charging batteries. Otherwise, what has been said in regard to Figures 3 and 4 also holds for the curves shown in Figures 6 and 7.

Figure 9:
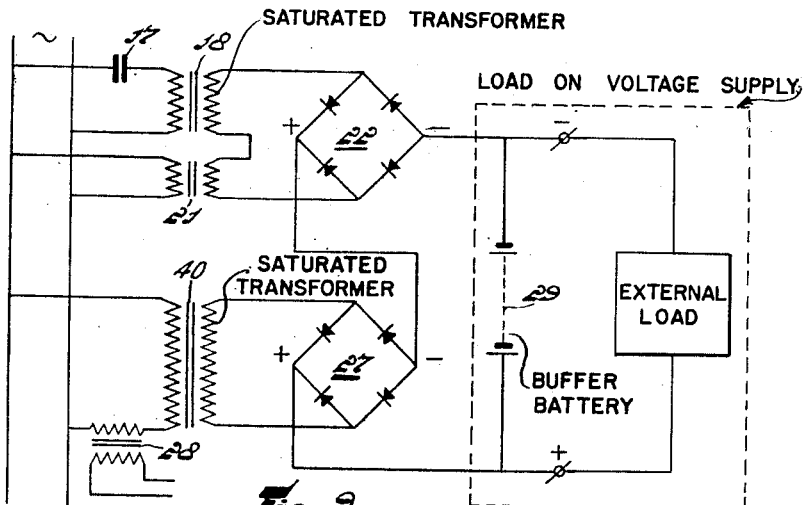
Figure 10:
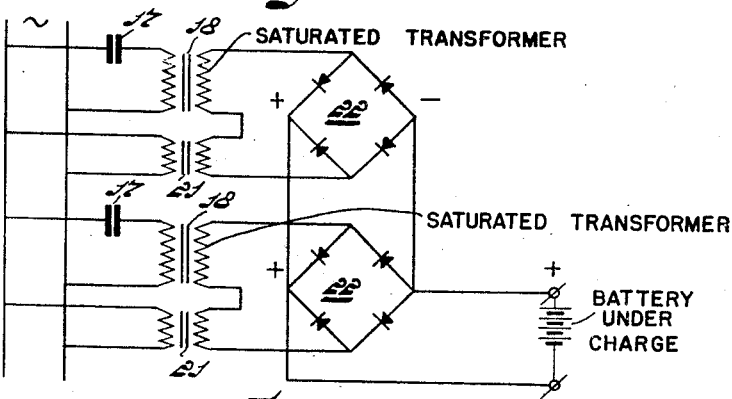

Finally Figures 9 and 10 represent a series-connection and a parallel-connection respectively, the circuit shown in Fig. 8 being used in both figures. When using the circuit shown in Fig. 8 to constitute the second rectifying circuit, either in series or in parallel, the current range a of the added voltage lump, for instance in Figures 6 and 7 may be varied by altering the capacity 17 shown in Fig. 8 or by a feed voltage variation. In this way a suitable adjustment of the said current range can be attained by controlling the capacity or the feed voltage.

In Fig. 9 the first rectifying circuit also corresponds to that shown in Fig. 8, the auxiliary rectifying circuit consisting of a common circuit comprising rectifiers 27 connected according to Graetz and a premagnetised choke 28 which serves for obtaining a sharply dropping curve, for instance as shown in Figure 3 or 4. In this figure a buffer battery 29 in conjunction with an external load is shown as a load.

In the series-connection of the rectifying circuits several particular difficulties may arise in conjunction with the fact that the load current also traverses the small-sized second rectifying circuit. When using for the latter a Graetz circuit (27 in Fig. 9), for instance, each of the shunt branches comprising two series-connected rectifiers will be traversed by one half of this current in the case of a strong load current, which causes an undesirable voltage loss in the case of using dry rectifiers, which will generally have to be used in conjunction with the conditions to be imposed upon the voltage and current range of the voltage lump. In Fig. 6 this voltage loss is indicated by the dotted line 30 which extends below the zero line as an extension of the curve 31. In the resulting curve this is indicated by the dotted line 32, which has a steeper shape than the part 23, due to which the imposed conditions of a sufficiently constant voltage in this range could not be satisfied.

Figure 11:
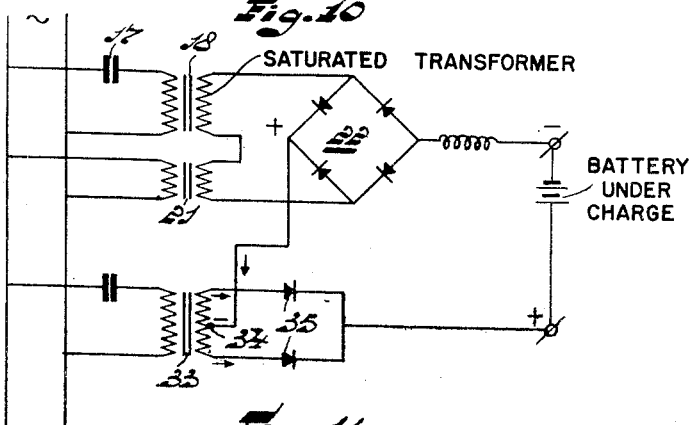

In accordance with the invention this drawback is overcome by means in which no use is made of switches or relays, viz. by making use of a two-phase rectifying circuit to constitute the series-connected auxiliary rectifier, which is represented in principle in Fig. 11. The auxiliary feed transformer is designated by 33, its midpoint tapping by 34 and the rectifiers by 35. With a high current load the current divides according to the arrows into the two shunt branches in such manner that in each branch only one rectifier instead of two rectifiers is traversed, the voltage loss being reduced to an admissible value. Thereby this problem is solved.

In this case, however, another problem arises which does not play a part in using a Graetz circuit 27 as shown in Fig. 9. In fact, in the last-mentioned case the high load current solely traverses the rectifiers and not the secondary winding of the transformer. When using the two-phase auxiliary rectifier the secondary winding, in contradistinction thereto, is loaded with these higher load currents. Consequently, this secondary will have to be wound from comparatively thick wire. Furthermore, since the transformer is proportioned for small power only and, for instance in the circuit shown in Fig. 9, is realized as a highly saturated transformer 40, while the poor form factor of the current with this midpoint connection further requires the use of considerable copper, it has been found in practice that the winding cannot be housed in the available space of the magnetic circuit.

Figure 12:
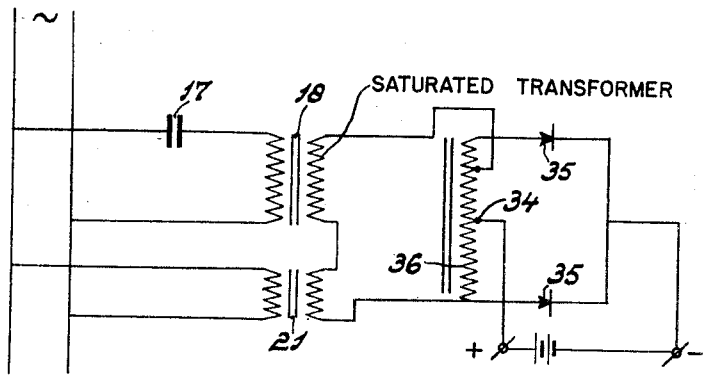
Figure 13:
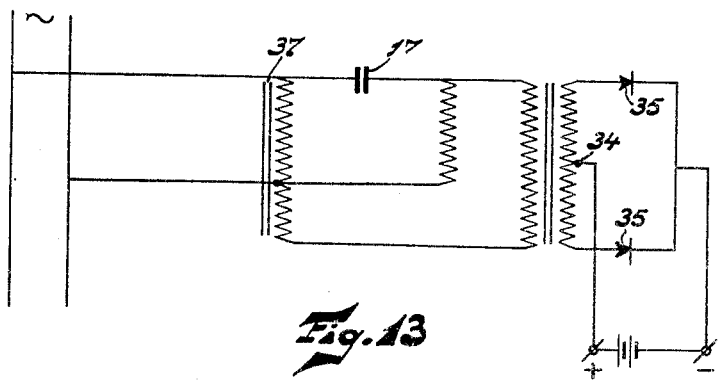

In this case a variant of this circuit is used, which is shown in Fig. 12 and instead of being connected to the auxiliary rectifying circuit 33, 34, 35 is connected to the first rectifying circuit 22. The primary part and the secondary windings of the transformers 18 and 21 may, for instance, be realised similarly to the auxiliary rectifying circuit shown in Fig. 9. However, the two two-phase connected rectifiers 35 are not connected directly to the secondary windings, but through the intermediary of an intermediate transformer 36 having a midpoint tapping 34 which may be realised as an auto-transformer. In this case this transformer may be safely equipped with a winding having a sufficient wire diameter. Otherwise this transformer may also be designed as a normal transformer having separated windings, as shown in Fig. 13. In this case the feed transformer will preferably be realised in auto-connection as shown at 31, which connection essentially corresponds to that shown in Fig. 12.

What I claim is:

1. A circuit-arrangement comprising an alternating-current source, a first rectifying system energized from said source and having an output voltage-current characteristic curve which is substantially steady with regard to voltage throughout a predetermined range of relatively small load values and which exhibits a current limitation in the case of high load values, a second rectifying system energized from said source and having an output voltage-current characteristic curve which declines with regard to voltage in the initial portion of a corresponding range of relatively small load values, and means to combine the outputs of said first and second systems to provide an output voltage.

2. A circuit-arrangement comprising an alternating-current source, a first rectifying system energized from said source and having an output voltage-current characteristic curve which is substantially steady with regard to voltage throughout a predetermined range of relatively small load values and which exhibits a current limitation in the case of high load values, a second rectifying system energized from said source and having an output voltage-current characteristic curve which declines with regard to voltage in the initial portion of a corresponding range of relatively small load values and which is substantially steady throughout the remaining portion of said corresponding range, and means to connect serially the outputs of said first and second systems to provide an output voltage.

3. A circuit-arrangement comprising an alternating-current source, a first rectifying system energized from said source and having an output voltage-current characteristic curve which is substantially steady with regard to voltage throughout a predetermined range of relatively small load values and which exhibits a current limitation in the case of high load values, a second rectifying system energized from said source and having an output voltage-current characteristic curve which declines with regard to voltage in the initial portion of a corresponding range of relatively small load values and which is substantially steady through the remaining portion of said corresponding range, and means to connect in parallel the outputs of said first and second systems to provide a final output voltage.

4. A circuit-arrangement comprising an alternating-current source, a first rectifying system energized from said source and having an output voltage-current characteristic curve which is substantially steady with regard to voltage throughout a predetermined range of relatively small load values and which exhibits a current limitation in the case of high load values, a second rectifying system energized from said source and having an output voltage-current characteristic curve which declines steeply with regard to voltage in the initial portion of a corresponding range of relatively small load values and which is substantially steady for the remaining portion of said range and which exhibits a current limitation in the case of high load values, and means to combine the output voltages of said systems to provide a final output voltage.

5. A circuit-arrangement comprising an alternating-current source, a first rectifying system energized from said source and having an output voltage-current characteristic curve which is substantially steady with regard to voltage throughout a predetermined range of relatively small load values and which exhibits a current limitation in the case of high values, a second rectifying system energized from said source and having an output voltage-current characteristic curve which declines steeply with regard to voltage in the initial portion of a corresponding range of relatively small load values and which is substantially steady for the remaining portion of said range and whcih exhibits a current limitation in the case of high load values, said second rectifying system including a saturable transformer having a primary coupled to the source and a secondary, a capacitor interposed between the primary of said saturable transformer and said source, an auxiliary transformer having a primary connected to said source and a secondary connected in series with the secondary of said saturable transformer and rectifying means coupled to the series-connected secondaries to derive a direct-current therefrom, and means to combine the output voltages of said systems to provide a final output voltage.

6. A circuit-arrangement comprising an alternating-current source, a first rectifying system energized from said source and having an output voltage-current characteristic curve which is substantially steady with regard to voltage throughout a predetermined range of relatively small load values and which exhibits a current limitation in the case of high load values, a second rectifying system energized from said source and having an output voltage-current characteristic curve which declines steeply with regard to voltage in the initial portion of a corresponding range of relatively small load values and which is substantially steady for the remaining portion of said range and which exhibits a current limitation in the case of high load values, and means to combine the output voltages of said systems to provide a final output voltage, said first and second rectifying systems each including a saturable transformer having a primary coupled to the source and a secondary, a capacitor interposed between the primary of said saturable transformer and said source, an auxiliary transformer having a primary connected to said source and a secondary connected in series with the secondary of said saturable transformer, and rectifying means coupled to the series-connected secondaries to derive a direct-current therefrom, the capacitor in said first system having a value relative to that in said second system effecting the desired characteristic curves.

7. A circuit-arrangement comprising an alternating-current source, a first rectifying system energized from said source and having an output voltage-current characteristic curve which is substantially steady with regard to voltage throughout a predetermined range of relatively small load values and which exhibits a current limitation in the case of high load values, a second rectifying system energized from said source and having an output voltage-current characteristic curve which declines steeply with regard to voltage in the initial portion of a corresponding range of relatively small load values and which is substantially steady for the remaining portion of said range and which exhibits a current limitation in the case of high load values, and means to combine the output voltages of said systems to provide a final output voltage, said second rectifying system including a saturable transformer having a primary and a secondary, a capacitor connected in series with the primary of said saturable transformer to the source, an auxiliary transformer having a primary connected to the source and a secondary connected in series with the secondary of the saturable transformer, an autotransformer having a winding and a tap therein, said series-connected secondaries being connected to said tap and one end of said winding, a pair of rectifiers connected in current opposition across said winding, and means to derive the direct-voltage from between the junction of said rectifiers and the electrical center of said winding.

HENDRIK ABRAHAM WIJNAND KLINKHAMER.

REFERENCES CITED

The following references are of record in the file of this patent:

UNITED STATES PATENTS

| Number | Name | Date |
|---|---|---|
| 1,916,307 | Gilson | July 4, 1933 |
| 1,962,484 | Dannheiser | June 12, 1934 |
| 2,079,500 | Foos | May 4, 1937 |
| 2,092,319 | Logan | Sept. 7, 1937 |
| 2,092,891 | Overbeck | Sept. 14, 1937 |
| 2,235,491 | Trucksess | Mar. 18, 1941 |
| 2,261,699 | Rampacher | Nov. 4, 1941 |
| 2,272,745 | Hinds et al. | Feb. 10, 1942 |
| 2,300,296 | Langabeer et al. | Oct. 27, 1942 |
| 2,322,955 | Perkins | June 29, 1943 |
| 2,341,280 | Ludbrook | Feb. 8, 1944 |
| 2,423,134 | Winkler | July 1, 1947 |
| 2,431,312 | Cronvall | Nov. 25, 1947 |
| 2,459,977 | Van de Heem | Jan. 25, 1949 |
| 2,464,935 | Leathers | Mar. 22, 1949 |
| 2,472,095 | Dawson | June 7, 1949 |